Oct. 31, 1950     D. S. MORISHITA ET AL     2,528,071
ORANGE PEELER
Filed March 19, 1946
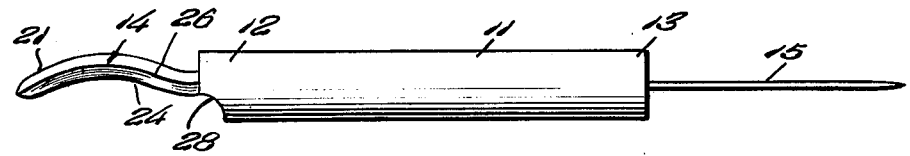
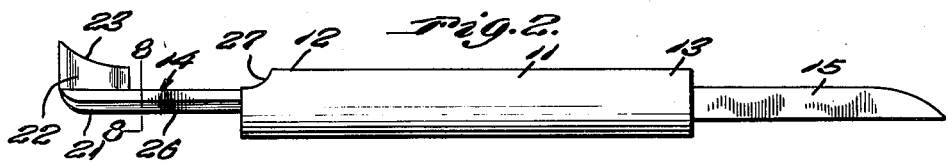
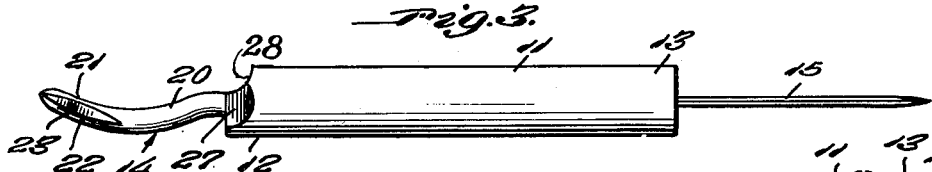
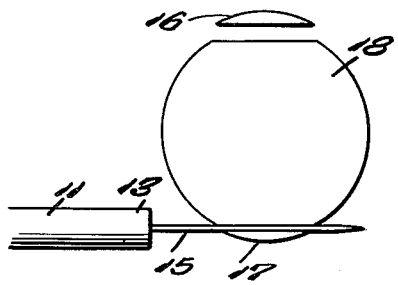
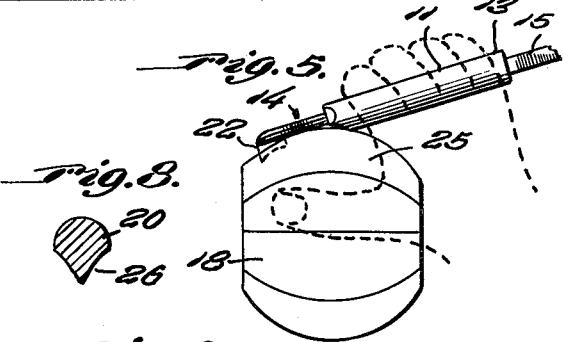
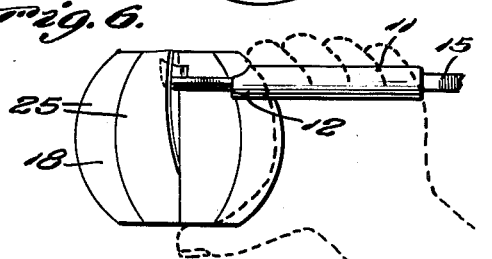
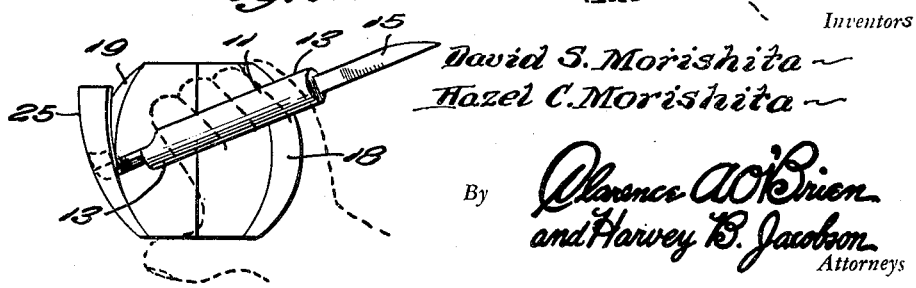
Inventors
David S. Morishita
Hazel C. Morishita
By Clarence A. O'Brien
and Harvey B. Jacobson
Attorneys Patented Oct. 31, 1950

2,528,071

UNITED STATES PATENT OFFICE 2,528,071

ORANGE PEELER

David S. Morishita and Hazel C. Morishita,
Honolulu, Territory of Hawaii

Application March 19, 1946, Serial No. 655,498

1 Claim. (Cl. 30—24)

This invention relates to new and useful improvements in kitchen appliances, and the primary object of the present invention is to provide an implement for removing the rind from an orange or other such fruit.

Another object of this invention is to provide a rind scoring implement including a blade supporting member that is transversely curved to conform to the contour of an orange.

A further object of the invention is to provide a rind scoring implement including an arcuate member projecting from one end of a hand grip and a blade secured to the arcuate member and having parallel side edges disposed laterally of the member and a concave edge extending between the side edges.

Other features and advantages will become more readily apparent from the following description and the accompanying illustrative drawings in which:

Figure 1 is an elevational view of the invention,

Figure 2 is another elevational view thereof,

Figure 3 is a plan view of the device,

Figures 4 to 7 are diagrammatic views illustrating the application of the device, and Figure 8 is a sectional view taken on line 8—8 of Figure 2.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device which is to be limited only in accordance with the appended claim. And while there is stated the primary field of utility of the invention it remains obvious that it may be employed in any other capacity wherein it may be found applicable.

Referring now to the drawings, wherein for the purpose of illustration, there is disclosed a preferred embodiment of the present invention, the numeral 11 represents a handle, from the ends 12 and 13 of which extend a peeling blade 14 and a slicing blade 15, the latter blade being straight and adapted to slice off the ends 16 and 17 of an orange 18.

The blade 14 is preferably arcuate to seat closely upon the inner body or outer surface 19 of the carpels of an orange. The back 20 of the blade 14 has projecting from its outer end 21, a short tapering blade 22, the cutting edge 23 being arcuate, the function of which is to slice the rind of the orange into strips 25, from apex to nadir after the ends 16 and 17 have been sliced off by the blade 15 in the manner indicated in Figure 5 of the drawings.

The blade 14 is wedge shaped in cross section (see Figure 8) and is provided with a feather edge 26 to insert between the rind and carpels to peel the strips 25 from the carpels as indicated in Figures 6 and 7. The wedge shape of the blade 14 lifts the strips making it easier for the feather edge 26 to follow the contour of the body of the orange. The sides 27 and 28 of the handle end 12 are chamfered or grooved to permit the blade 14 to lie flat upon said orange body in peeling said strip of rind.

From the foregoing specification it will become apparent that the invention disclosed will adequately accomplish the functions for which it has been designed and in an economical manner and that its simplicity, accuracy and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having thus described the invention that those versed in its particular art will fully understand how to make and use the same, as well as its functions, and without having attempted to detail all of the forms in which it may be made, all of its advantages, or all of the uses to which it may be put, it is declared that which is claimed as new and sought to be protected by Letters Patent is:

A rind scoring implement comprising an elongated hand grip, an arcuate member projecting from one end of said hand grip and having a back, and a blade secured to the back of said arcuate member and at the outer end of said arcuate member, said blade having parallel side edges disposed laterally of said arcuate member and convex side faces meeting at said side edges, said blade also having a concave edge extending between said side edges, said hand grip having a recess in the end thereof from which said arcuate member projects to permit the central portion of said arcuate member to rest against an orange when one side edge of said blade is being used to slice a rind, one side edge of said blade lying in a plane substantially through the longitudinal axis of said hand grip and the other side edge of said blade being offset from said one side edge of said blade.

DAVID S. MORISHITA.
HAZEL C. MORISHITA.

REFERENCES CITED

The following references are of record in the file of this patent:

UNITED STATES PATENTS

| Number | Name | Date |
|---|---|---|
| D. 32,846 | Casselman | June 19, 1900 |
| 509,515 | Dietz | Nov. 28, 1893 |
| 687,820 | Crandall | Dec. 3, 1901 |
| 1,041,767 | Frank | Oct. 22, 1912 |
| 1,261,954 | Newman | Apr. 9, 1918 |
| 1,452,930 | Polk | Apr. 24, 1923 |
| 1,479,015 | Steinman | Jan. 1, 1924 |
| 1,640,656 | Heller et al. | Aug. 30, 1927 |
| 2,010,414 | Rekonty | Aug. 6, 1935 |
| 2,022,954 | Cook | Dec. 3, 1935 |